US010338880B2

(12) United States Patent
Burton (10) Patent No.: US 10,338,880 B2
(45) Date of Patent: Jul. 2, 2019

(54) AUDIO DEVICES AND RELATED METHODS FOR ACQUIRING AUDIO DEVICE USE INFORMATION

(71) Applicant: Skullcandy, Inc., Park City, UT (US)

(72) Inventor: Thomas Burton, Park City, UT (US)

(73) Assignee: Skullcandy, Inc., Park City, UT (US)

( * ) Notice: Subject to any disclaimer, the term of this patent is extended or adjusted under 35 U.S.C. 154(b) by 0 days.

(21) Appl. No.: 15/159,636

(22) Filed: May 19, 2016

(65) Prior Publication Data

US 2016/0357501 A1 Dec. 8, 2016

Related U.S. Application Data

(60) Provisional application No. 62/170,577, filed on Jun. 3, 2015.

(51) Int. Cl.
*G06F 3/16* (2006.01)
*G06Q 30/02* (2012.01)
*H04R 3/00* (2006.01)

(52) U.S. Cl.
CPC .............. *G06F 3/162* (2013.01); *G06F 3/165* (2013.01); *G06Q 30/0201* (2013.01);
(Continued)

(58) Field of Classification Search
CPC .... G06F 3/162; G06F 3/165; G06F 17/30743; H04R 3/00; H04R 2420/07;
(Continued)

(56) References Cited

U.S. PATENT DOCUMENTS 9,563,268 B2 * 2/2017 Smith .................... G06F 3/011
2006/0059277 A1 3/2006 Zito et al.
(Continued)

FOREIGN PATENT DOCUMENTS

CN 1717956 A 1/2006
CN 102215740 A 10/2011
(Continued)

OTHER PUBLICATIONS

European Search Report for European Application No. 16170229 dated completed Sep. 14, 2016, 7 pages.
(Continued)

*Primary Examiner* — Fan S Tsang
*Assistant Examiner* — Angelica M McKinney
(74) *Attorney, Agent, or Firm* — TraskBritt (57) ABSTRACT

Audio devices and related methods are disclosed. An audio device includes audio inputs configured to receive audio signals from a media player, speaker elements configured to convert the audio signals to acoustic waves, and control circuitry. The control circuitry includes a tracking module configured to extract use information from the audio and store use data including the use information on a data storage device of the audio device. A method includes transmitting the use data to a use data router configured to route the use data to a remote sever. A method of transforming a personal computing device into a use data router includes storing computer-readable instructions configured to instruct a processing element of a personal computing device to receive the use data from the audio device, and transmit the use data to the remote server. The method also includes transmitting the computer-readable instructions to the personal computing device.

16 Claims, 4 Drawing Sheets

(52) U.S. Cl.
CPC ..... *G06Q 30/0242* (2013.01); *G06Q 30/0251* (2013.01); *H04R 3/00* (2013.01); *H04R 2420/07* (2013.01)

(58) Field of Classification Search
CPC ...... H04R 1/1091; G10H 1/40; G10H 1/0008; A61B 5/02438; A61B 5/0002; G06Q 30/0201; G06Q 30/0242; G06Q 30/0251
See application file for complete search history.

(56) References Cited

U.S. PATENT DOCUMENTS

| | | | |
|---|---|---|---|
| 2006/0107822 A1* | 5/2006 | Bowen | G10H 1/40 84/612 |
| 2007/0113725 A1* | 5/2007 | Oliver | A61B 5/02438 84/612 |
| 2007/0113726 A1* | 5/2007 | Oliver | A61B 5/0006 84/615 |
| 2008/0076972 A1* | 3/2008 | Dorogusker | A61B 5/02055 600/300 |
| 2008/0263579 A1* | 10/2008 | Mears | G11B 27/322 725/9 |
| 2011/0040395 A1* | 2/2011 | Kraemer | G10L 19/00 700/94 |
| 2014/0106677 A1 | 4/2014 | Altman | |
| 2014/0119554 A1* | 5/2014 | Chan | H04R 1/1091 381/74 |
| 2014/0277648 A1 | 9/2014 | Chong et al. | |
| 2015/0081066 A1 | 3/2015 | Yeh et al. | |
| 2015/0100144 A1* | 4/2015 | Lee | H04W 4/005 700/94 |
| 2015/0110282 A1* | 4/2015 | Sun | H04B 3/23 381/66 |
| 2015/0223731 A1 | 8/2015 | Sahin | |
| 2015/0258301 A1 | 9/2015 | Trivedi et al. | |
| 2015/0279418 A1* | 10/2015 | Laksono | G11B 20/10527 386/248 |
| 2015/0358438 A1 | 12/2015 | Kim et al. | |
| 2016/0089028 A1* | 3/2016 | Chatterjee | A61B 5/0002 340/870.07 |
| 2016/0094700 A1 | 3/2016 | Lee et al. | |
| 2016/0134997 A1 | 5/2016 | Guo | |
| 2017/0149945 A1* | 5/2017 | Lee | H04M 1/6066 |
| 2017/0150255 A1* | 5/2017 | Wang | H04R 3/005 |
| 2017/0180911 A1 | 6/2017 | Burton | |
| 2017/0214786 A1 | 7/2017 | Lee et al. | |
| 2017/0308182 A1 | 10/2017 | Belverato | |

FOREIGN PATENT DOCUMENTS

| | | |
|---|---|---|
| CN | 102308295 A | 1/2012 |
| CN | 102930888 A | 2/2013 |
| CN | 104363557 A | 2/2015 |
| CN | 104954949 A | 9/2015 |
| CN | 106571844 A | 4/2017 |
| EP | 2431900 | 3/2012 |
| KR | 1020160113072 A | 9/2016 |
| WO | 2010/092423 A1 | 8/2010 |
| WO | 2013188769 A1 | 12/2013 |
| WO | 2014144918 | 9/2014 |
| WO | 2015157677 A1 | 10/2015 |

OTHER PUBLICATIONS

European Communication for European Application No. 16170229.5 dated Feb. 19, 2018, 6 pages.
Concept Phones, Wearable Phone, http://www.concept-phones.com/?s=wearable+phone. visited Aug. 19, 2015, 19 pages.
Seth, Radhika, Phone, Ear-Phone, Phone, www.yankodesign.com/2009/06/08/phone-ear-phone-phone/, Jun. 8, 20019, 13 pages.
Chinese Office Action and Search Report for Chinese Application No. 201610373652.9, dated Aug. 20, 2018, 39 pages.
Chinese Office Action and Search Report for Chinese Application No. 201611188251, dated Mar. 1, 2019, 38 pages with translation.

* cited by examiner

AUDIO DEVICES AND RELATED METHODS FOR ACQUIRING AUDIO DEVICE USE INFORMATION

CROSS-REFERENCE TO RELATED APPLICATIONS

This application claims the benefit of U.S. Provisional Patent Application Ser. No. 62/170,577, filed Jun. 3, 2015, the disclosure of which is hereby incorporated herein in its entirety by this reference. The subject matter of this application is related to U.S. patent application Ser. No. 15/377,826, filed Dec. 13, 2016, which is a utility conversion of U.S. Provisional Patent Application Ser. No. 62/270,415, filed Dec. 21, 2015.

FIELD

Embodiments of the disclosure relate to audio devices and related methods for extracting use information from audio signals, and more particularly to headphones and speakers configured to track use of audio content played thereby.

BACKGROUND

Information is a valuable resource in today's information age. For example, consumer information is valuable to merchants that sell goods and services at many levels, from product development to marketing, advertising, and sales. In order to acquire consumer information, some merchants employ member accounts to facilitate accumulation of consumer data (e.g., who purchases what, and when and where it was purchased, etc.). Merchants sometimes provide discounts and other benefits in exchange for the consumers' memberships. As a specific example, grocery stores sometimes provide discounts on groceries to consumers that sign up for member accounts.

Similarly, some digital media providers (e.g., Netflix, iTunes, etc.) track the distribution and use of media content they provide to consumers. It may be relatively easy for digital media providers to track what content is provided to and played by which customers, as their customers generally have user accounts that are monitored by the media providers, and dedicated media players that transmit use data to the digital media providers.

BRIEF SUMMARY

In some embodiments, disclosed is an audio device including one or more electrical interfaces, one or more speaker elements, and control circuitry. The one or more electrical interfaces include one or more audio inputs configured to receive audio signals from a media player, and one or more communication interfaces configured to communicate with a use data router. The one or more speaker elements are operably coupled to the one or more audio inputs and are configured to convert the audio signals from the media player to acoustic waves. The control circuitry includes one or more data storage devices including a tracking module operably coupled to the one or more audio inputs and configured to extract use information from the audio signals and generate use data including the use information. The storage interface is operably coupled to the tracking module and the one or more data storage devices and is configured to store the use data generated by the tracking module in the one or more data storage devices.

In some embodiments, disclosed is a method of operating an audio device. The method includes receiving, with an audio input of an audio device, an audio signal from a media player, and extracting use information from the audio signal by analyzing the audio signal with a tracking module of the audio device. The method also includes storing use data including the use information on a data storage device, and transmitting the use data to a use data router configured to route the use data to a remote server.

In some embodiments, disclosed is a method of transforming a personal computing device into a use data router. The method includes storing, on a storage device of a software distribution server, computer-readable instructions configured to instruct a processing element of a personal computing device to communicate with an audio device configured to receive audio signals from a media player and convert the audio signals into acoustic waves. The computer-readable instructions are also configured to instruct the processing element of the personal computing device to receive, from the audio device, use data including information extracted from the audio signals by the audio device, and transmit the use data to a remote server. The method may also include transmitting the computer-readable instructions to the personal computing device.

In some embodiments, disclosed is a headphone device including one or more data storage devices, a media player, and one or more communication interfaces. The one or more data storage devices are configured to store audio content received from a media/use router including a personal computing device of a user of the headphone device. The media player is configured to play the audio content stored on the one or more data storage devices when the headphone device is disconnected from the media/use router, monitor specifics of use of the audio content by the headphone device, and store, on the one or more data storage devices, a use record including information identifying specifics of use of the audio content by the headphone device. The one or more communication interfaces are configured to receive the audio content from the media/use router, and provide the use record to the media use router.

In some embodiments, disclosed is a method of operating an audio system. The method includes providing audio content to a media/use router of a user of a headphone device to enable the user to store the audio content to the headphone device and play the audio content with the headphone device. The method also includes receiving a use record generated by the headphone device, and routed by the media/use router from the headphone device, the use record identifying specific uses of the audio content by the headphone device. The method further includes storing the use data in a use database stored in one or more data storage devices of one or more servers remote from the headphone device.

DETAILED DESCRIPTION

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

Embodiments of the disclosure include audio devices configured to extract use information from audio signals, use data routers configured to route use information from audio devices to remote servers, and related methods. It should be noted that while the utility and application of the various embodiments of the disclosure are described with reference to headphone devices, the disclosure also finds application to any device configured to convert audio signals received from a media player to acoustic waves, such as, for example, audio speakers (e.g., wireless audio speakers).

As used herein, the term "use data" refers to data corresponding to information extracted from audio signals that may be used to determine how an audio device is used (e.g., what audio content was listened to, skipped, etc.). "Use data" may also include supplemental information to the information extracted from the audio signals. By way of non-limiting example, "use data" may also include date/time information including information indicating at least one of a date and a time at which the information extracted from the audio signals was extracted from the audio signals. Also by way of non-limiting example, the "use data" may include sensor information provided by sensors near the time that the information extracted from the audio signals was extracted. Accordingly, "use data" may include not only information about what audio content was listened to, skipped, etc., but also when the user listens to what, where the user listens to it, what is listened to while the user is moving, sitting still, exercising, etc.

As used herein, the term "audio content" may refer to any media content that includes an audible component that may be played on an audio device. For example, both purely audible content (e.g., music, radio, audio podcasts) and mixed media content (e.g., audio-video) include audible components.

As used herein, the terms "operably couple," "operably coupled," "operably coupling," and other forms of the term "operably couple" refer to both wireless (BLUETOOTH®, WiFi, ZIGBEE®, etc.) and wired (e.g., electrical, optical, etc.) connections. "Operably couple," and its other forms may also refer to both direct (i.e., nothing coupled in between operably coupled components) and indirect (i.e., other components coupled in between operably coupled components) connections.

Figure 1:
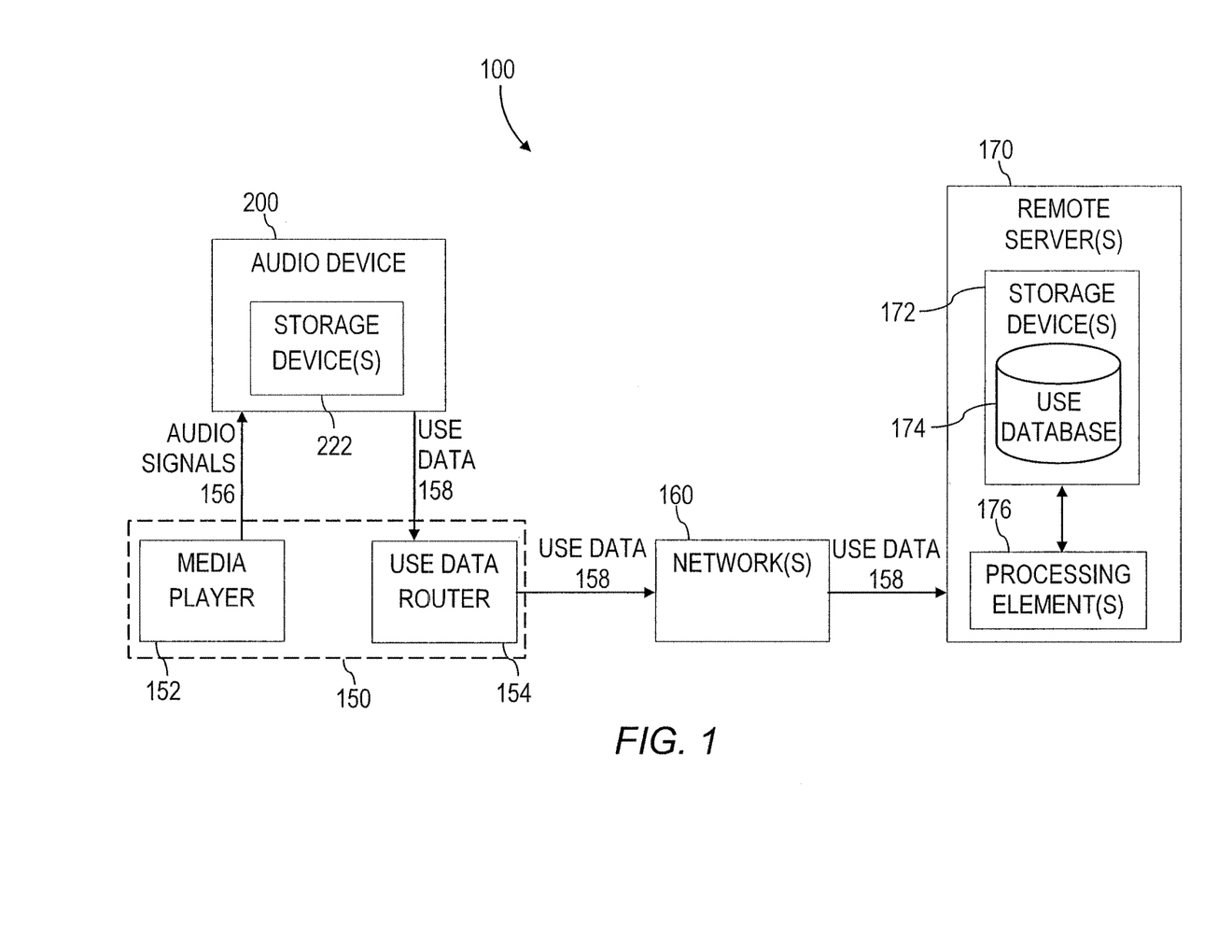
FIG. 1 is a simplified block diagram of an audio system.

FIG. 1 is a simplified block diagram of an audio system 100. The audio system 100 may include an audio device 200 configured to operably couple to a media player 152 and a use data router 154. The use data router 154 may be configured to communicate with one or more remote servers 170 (hereinafter "remote server" 170) through one or more networks 160 (hereinafter "networks" 160) (e.g., the internet, mobile wireless networks, WiFi networks, BLUETOOTH® networks, cloud networks, wired data networks, etc.).

The audio device 200 may be configured to receive audio signals 156 from the media player 152, and convert the audio signals 156 to acoustic waves that may be heard by a user of the audio device 200. While the audio device 200 is receiving the audio signals 156 from the media player, the audio device may extract use information from the audio signals 156, and store use data 158 including the use information in one or more data storage devices 222 (hereinafter "storage device" 222) of the audio device 200. While the audio device 200 is operably coupled to the use data router 154, the audio device 200 may transmit the use data 158 stored in the storage device 222 to the use data router 154. The use data router 154 may be configured to receive the use data 158 from the audio device 200, and transmit the use data 158 to the remote server 170 through the networks 160. The remote server 170 may be configured to receive the use data 158, and store the use data 158 in a use database 174 stored on one or more data storage devices 172 (hereinafter "data storage device" 172) of the remote server 170.

The audio device 200 may include a headphone device, a speaker device (e.g., a wireless speaker), or other audio device configured to convert audio signals 156 received from the media player 152 to acoustic waves that may be heard by a user of the audio device 200. In some embodiments, the audio device 200 may be configured to identify audio content (e.g., songs, artists, movies, television programs, other identifiable media having audio components, etc.) provided by the audio signals 156. By way of non-limiting example, the audio device 200 may be configured to execute a media identification algorithm to identify the audio content. In such embodiments, the use data 158 may include identification information identifying the audio content. In some embodiments, the audio device 200 may be configured to recognize identification code provided by certain media players 152 with the audio content in the audio signals 156. Although this approach may require relatively little processing power, not all media players 152 provide such identification information (e.g., non-digital media players), and some media players 152 may provide coded identification information that may not be readable by the audio device 200. Accordingly, in some embodiments, the audio device 200 may also be configured to identify the audio content by analyzing the audio content itself, using methods similar to media recognition algorithms known in the art (e.g., the Shazam mobile software application). Accordingly, the audio device 200 may be configured to identify audio content delivered by any media player 152, even more vintage-type media players 152 (e.g., record players, analog radios, etc.), and media players using coded identification information that cannot be read by the audio device 200.

In some instances, it may be desirable for the user to listen to audio content provided by the audio signals 156 without the audio device 200 interfacing with the use data router 154 (e.g., in instances where the user is on the go using a portable media player, such as during exercise, travel, work, etc., or just does not have access to the use data router 154). In such instances, the use data 158 may accumulate in the storage device 222 over time until the next time the audio device 200 enters communication with the use data router 154. Also, in such instances, the audio device 200 may have limited media identification capabilities, as it may be unpractical to store large media identification databases on the storage device 222 of the audio device 200, or to execute complex media recognition algorithms without assistance from the use data router 154 or the remote servers 170. Accordingly, in some embodiments, the audio device 200 may be configured to store use data 158 to the storage device 222 that includes segments of the audio content (e.g., the audio signals 156), or characteristic information about the audio signals 156, for later processing (e.g., when the audio device 200 is connected to the use data router 154) to identify the audio content. Also, in some embodiments, the audio device 200 may be configured to transmit such use data 158 to the use data router 154, which may then perform a media identification algorithm, or forward the use data 158 to the remote servers 170 to perform a media identification algorithm.

The audio device 200 may also be configured to generate the use data 158 including additional information that is supplemental to the use information extracted from the audio signals 156. For example, the audio device 200 may be configured to recognize if certain audio tracks are skipped (e.g., by identifying breaks in the audio signals 156) or repeated. Also, the audio device 200 may be configured to keep track of dates and times when certain audio content was listened to. Furthermore, the audio device 200 may include sensors (e.g., ambient light sensors, temperature sensors, motion sensors, global positioning system (GPS) sensors, etc.) to provide supplemental information about where the user was, and what the user was doing when certain audio content was listened to. More information about the audio device 200 will be discussed below with reference to FIG. 2.

The media player 152 may include any device configured to generate audio signals 156 that may be transmitted to (e.g., via wired or wireless transmission lines), and converted to acoustic waves by, the audio device 200. By way of non-limiting example, the media player 152 may include any of an MP3 player, a digital media player, a software-based media player executed by a personal computing device (e.g., a cellular phone, a smartphone, a smartwatch, a tablet computer, a laptop computer, a desktop computer, other personal computing devices, etc.), a media disc player (e.g., a compact disc (CD) player, a digital versatile disc (DVD) player, a Blu-ray disc player, a laser disc player, other media disc players, etc.), a video home system (VHS) cassette player, a vinyl record player, an audio cassette player, and other media players.

The use data router 154 may be configured to route use data 158 from the audio device 200 to the remote servers 170 through the networks 160 (e.g., the Internet). The use data router 154 may serve as an interface between the audio device 200 and the remote servers 170. As a result, the use data router 154 may be capable of network communications. The use data router 154 may include a personal computing device (e.g., a cellular phone, a smartphone, a smartwatch, a tablet computer, a laptop computer, a desktop computer, other personal computing devices, etc.) modified with software configured to transform the personal computing device into a use data router 154.

The use data router 154 may also be configured to perform some processing on the use data 158 received from the audio device 200. By way of non-limiting example, the use data router 154 may be configured to execute media recognition algorithms on segments of audio content and other characteristic information of the audio content of the use data 158 provided by the audio device 200. As the use data router 154 is configured to communicate through the networks 160, the use data router 154 may be capable of accessing online media identification databases to enable media identification processing.

In some embodiments, one or more media players 152 may be implemented on the same personal computing device as the use data router 154. Accordingly, a combined device 150 may include both a media player 152 and a use data router 154. In some embodiments, the media player 152 may include a software media player provided by the same entity as the audio device 200, software for the use data router 154, or a combination thereof. By way of non-limiting example, the media player 152 may be configured to provide coding in the audio signals 156 that enable at least one of the audio device 200, the use data router 154, and the remote server 170 to identify the audio content of the audio signals 156 with relatively little processing.

The remote servers 170 may be configured to receive the use data 158 from the use data router 154 through the networks 160, and store the use data 158 in the use database 174. The remote servers 170 may include one or more processing elements 176 (referred to hereinafter as "processing elements" 176) configured to process the use data 158 stored in the use database 174. By way of non-limiting example, the processing elements 176 may be configured to perform media identification algorithms on the use data 158 (e.g., if media recognition has not previously been done by the audio device 200 or the use data router 154), perform further processing such as, for example, pattern recognition algorithms (e.g., what types of content the user tends to consume while participating in certain activities, at certain dates and times, and in certain locations, etc.). In some embodiments, one of the audio device 200 and the use data router 154 may instead perform such pattern recognition algorithms on the use data 158.

Thus configured, the audio system 100 may enable the remote servers 170 to accumulate information that may be valuable to media providers, advertisers, merchants, and other parties. Entities operating the remote servers 170 may contractually acquire permission from the user of the audio device 200 to collect the use data 158. By way of non-limiting example, the use data router 154 may be configured to enable the user to electronically enter into a contract, through the networks 160, to allow the entity operating the remote servers 170 to collect the use data 158. Also by way of non-limiting example, in exchange for permission to collect the use data 158, incentives (e.g., a free or discounted audio device 200, free or discounted media content, etc.) may be provided to the user of the audio device 200.

Figure 2:
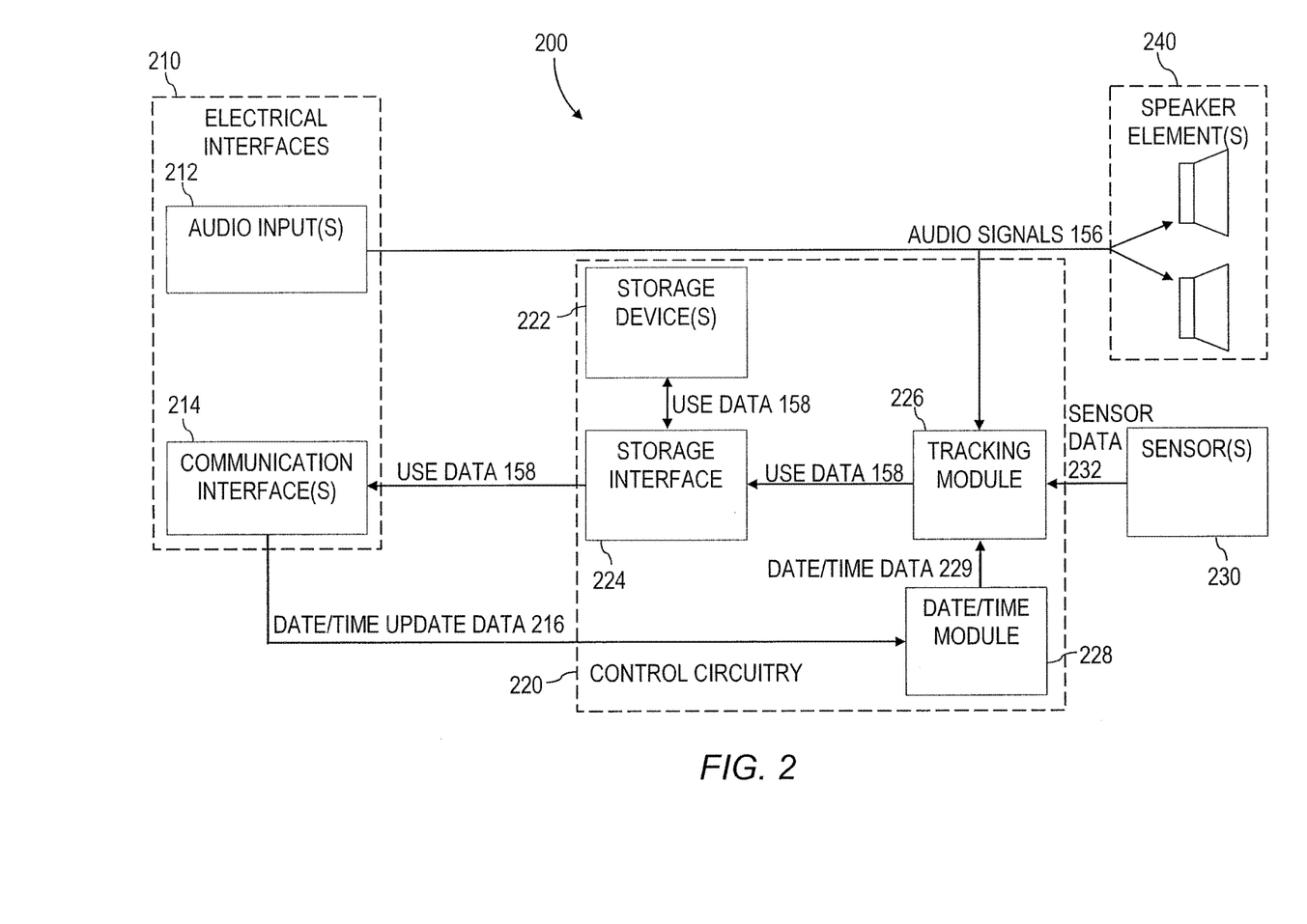
FIG. 2 is a simplified block diagram of an audio device of the audio system of FIG. 1.

FIG. 2 is a simplified block diagram of an audio device 200 of the audio system 100 of FIG. 1. The audio device 200 may include electrical interfaces 210 including one or more audio inputs 212 (hereinafter "audio inputs" 212) configured to receive the audio signals 156 from the media player 152 (FIG. 1). In some embodiments, the audio inputs 212 may include at least one of wired and wireless audio inputs 212 (e.g., an audio cable including a 3.5 millimeter audio plug, a wired audio connector, a BLUETOOTH® wireless audio input, a WiFi wireless audio input, other audio inputs 212, and combinations thereof). The audio device 200 may also include one or more speaker elements 240 (e.g., headphone speaker elements, speaker elements of a wireless speaker device, etc.) operably coupled to the audio inputs 212 and configured to convert audio signals 156 received through the audio inputs 212 into acoustic waves that may be heard by a user of the audio device 200. It should be understood that, in some embodiments, other components may be operably coupled between the audio inputs 212 and the speaker elements 240 (e.g., audio amplifiers, circuitry to convert digital audio signals to analog audio signals, other circuitry, and combinations thereof) without departing from the scope of the disclosure.

The audio device 200 may also include control circuitry 220 operably coupled to the audio inputs 212. The control circuitry 220 may be configured to extract use information from the audio signals 156, and store use data 158 including the use information. The control circuitry 220 may include a tracking module 226 configured to receive the audio signals 156 from the audio inputs 212, extract the use information from the audio signals 156, and generate the use data 158. It should be understood that the audio device 200 may instead include one or more microphones (not shown) configured to convert acoustic waves provided by the speaker elements 240 to electrical signals, and provide the electrical signals to the tracking module 226, which may in turn extract the use information from the electrical signals.

The control circuitry 220 may also include the storage device 222 and a storage interface 224 operably coupled to the storage device 222. The tracking module 226 may be configured to store the use data 158 on the storage devices 222 through the storage interface 224. By way of non-limiting example, the storage device 222 may include electrically programmable read only memory (EPROM), Flash memory, a secure digital (SD) memory card and slot, other integral or detachable storage media, other storage devices, and combinations thereof.

The electrical interface 210 may also include one or more communication interfaces 214 (hereinafter "communication interfaces" 214). The control circuitry 220 may be configured to transmit the use data 158 stored on the storage device 222 to the use data router 154 (FIG. 1) through the communication interfaces 214. The communication interfaces 214 may include at least one of wired and wireless communication interfaces (e.g., Universal Serial Bus (USB) interfaces, other wired interfaces, BLUETOOTH® wireless interfaces, WiFi wireless interfaces, other wireless interfaces, and combinations thereof). In some embodiments, the audio inputs 212 and the communication interfaces 214 may be included in the same electrical interfaces 210 (e.g., audio signals 156 may be received through the same wireless and wired interfaces that are used to transmit the use data 158 to the use data router 154). In some embodiments, the audio inputs 212 may be separate from the communication interfaces 214.

In some embodiments, the control circuitry 220 may also include a date/time module 228 configured to keep track of at least one of a date and a time. The date/time module 228 may be configured to provide date/time data 229 including at least one of the date and the time to the tracking module 226. The tracking module 226 may be configured to receive the date/time data 229, and provide information including at least one of the date and the time that the use information was extracted from the audio signals 156 in the use data 158. In other words, in some embodiments, the use data 158 may include information indicating at least one of the date and the time that the use information included therein was extracted. Accordingly, an accurate historical record of the use of the audio device 200 may be reconstructed using the use data 158.

In some embodiments, the date/time module 228 may be configured to receive date/time update data 216 configured to synchronize the date/time module 228 to a clock/calendar of the use data router 154 (FIG. 1), the remote servers 170, or other clock/calendar. Accordingly, if the audio device 200 is battery powered, the correct date and time may be provided to the date/time module 228 by the use data router 154 (FIG. 1) after battery replacement or recharge following battery depletion.

In some embodiments, the audio device 200 may include one or more sensors 230 (hereinafter "sensors" 230). The sensors 230 may be configured to detect environmental information, and provide sensor data 232 including the environmental information to the tracking module 226. The tracking module 226 may be configured to receive the sensor data 232, and provide at least some of the environmental information included therein in the use data 158. In other words, the use data 158 may include environmental information detected by the sensors 230 at about the same time that the use information was extracted from the audio signals 156.

By way of non-limiting example, the sensors 230 may include ambient light sensors. If ambient light information is included in the use data 158, it may be determined what media the user consumed while indoors, outdoors, in bright light, in dim light, etc. Also by way of non-limiting example, the sensors 230 may include temperature sensors. If temperature information is included in the use data 158, it may be determined what media the user consumed while indoors, outdoors, on hot days, on cold days, etc.

As another non-limiting example, the sensors 230 may include motion sensors (e.g., an accelerometer, a compass, a gyroscope, other motion sensors, and combinations thereof). If motion sensor information is included in the use data 158, it may be determined what media the user consumed while exercising, walking, sitting still, laying down, other actions, etc. As a further non-limiting example, the sensors 230 may include Global Positioning System (GPS) sensors. If GPS information is included in the use data 158, it may be determined what media the user consumed at precise locations.

In operation, one of the audio inputs 212 may be operably coupled to a media player 152 (FIG. 1), and the audio input 212 may provide audio signals 156 from the media player 152 to the speaker elements 240 and the control circuitry 220. The speaker elements 240 may convert the audio signals to acoustic waves, which the user may listen to. The tracking module 226 of the control circuitry 220 may extract use information from the audio signal 156, and store use data 158 including the use information from the audio signals 156 on the storage device 222 through the storage interface 224. The use data 158 may also include information from date/time data 229 provided by the date/time module 228, and environmental information from sensor data 232 provided by the sensors 230. Use data 158 may accumulate in the storage device 222 until one of the communication interfaces 214 is operably coupled to a use data router 154 (FIG. 1). When one of the communication interfaces 214 is operably coupled to the use data router 154, the control circuitry 220 may provide the use data 158 stored on the storage device 222 to the use data router 154 through the communication interface 214. Also, the date/time module 228 may receive date/time update data 216 from the use data router 154 through the communication interface 214.

Figure 3:
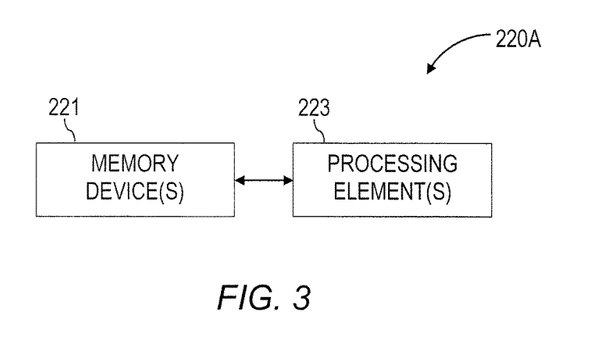
FIG. 3 is a simplified block diagram of an example of at least a portion of control circuitry that may be used in the control circuitry of FIG. 2.

FIG. 3 is a simplified block diagram of an example of at least a portion of control circuitry 220A that may be used in the control circuitry 220 of FIG. 2. The control circuitry 220A may include at least one memory device 221 (hereinafter memory device 221) operably coupled to at least one processing element 223 (hereinafter "processing element" 223). The memory device 221 may include random access memory (e.g., SRAM, DRAM, etc.), Flash memory, an electrically programmable read only memory (EPROM), a digital media reader (e.g., a CD ROM drive, a DVD ROM drive, a floppy disk drive, a memory card reader, etc.) other memory devices, and combinations thereof. In some embodiments, the memory device may be incorporated with the storage device 222 (FIG. 2) (e.g., a partition of the storage device 222). The memory device 221 may include computer-readable instructions configured to instruct the processing element 223 to perform at least a portion of the functions that the control circuitry 220 (FIG. 2) is configured to perform. By way of non-limiting example, the computer-readable instructions may be configured to instruct the processing element 223 to perform at least some of the functions of the tracking module 226, the date/time module 228, the storage interface 224 (FIG. 2), and combinations thereof.

The processing element 223 may be configured to execute the computer-readable instructions of the memory device 221. By way of non-limiting example, the processing element 223 may include a microcontroller, a programmable logic controller (PLC), a digital signal processor (DSP), other processing elements, and combinations thereof. In some embodiments, the memory device 221 and the processing element 223 may both be included in a same semiconductor package (e.g., a microcontroller including internal storage, etc.).

The present disclosure is not limited to control circuitry 220A including the memory device 221 and the processing element 223. In some embodiments, the control circuitry 220 (FIG. 2) may, in addition to or instead of the control circuitry 220A, be implemented with an array of logic circuits arranged and interfaced in a manner selected to perform at least a portion of the functions the control circuitry 220A is configured to perform. By way of non-limiting example, the control circuitry 220 may include an array of logic circuits interfaced with programmable switches that are positioned in a manner selected to carry out at least a portion of the functions that the control circuitry 220A is configured to perform (e.g., an FPGA). Also by way of non-limiting example, the array of logic circuits may be interfaced using hard-wired interfaces (e.g., an application specific integrated circuit (ASIC), a system on chip (SoC), etc.). Furthermore, the control circuitry 220 (FIG. 2) may be configured to perform at least a portion of the functions that the control circuitry 220A is configured to perform using hardware components (e.g., discrete circuit components, integrated circuits, etc.).

Figure 4:
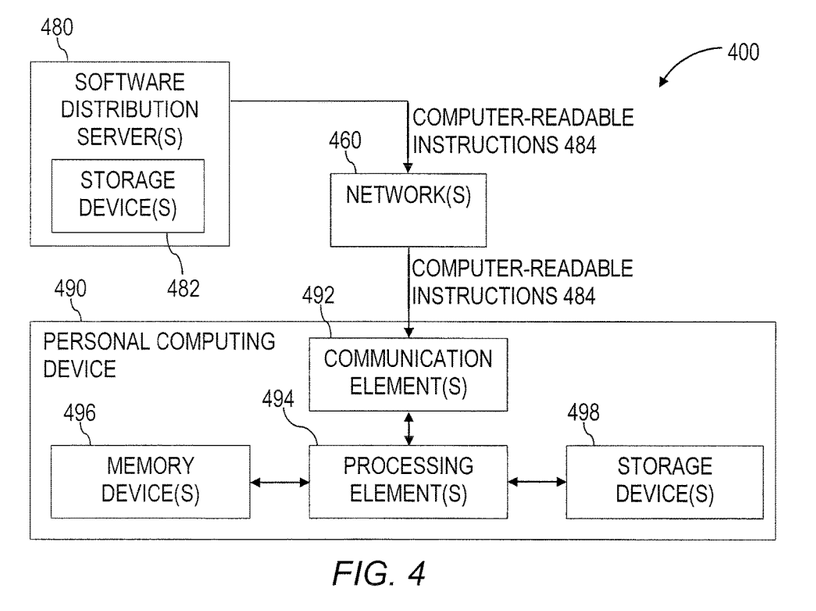
FIG. 4 is a simplified block diagram of a system for converting a personal computing device of a user of the audio device of FIG. 1 into the use data router of FIG. 1.

FIG. 4 is a simplified block diagram of a system 400 for converting a personal computing device 490 of a user of the audio device 200 of FIG. 1 into the use data router 154 of FIG. 1. The system 400 may include one or more software distribution servers 480 (hereinafter software distribution server" 480) configured to communicate with the personal computing device 490 of the user of the audio device 200 through one or more networks 460 (e.g., may be the same as the networks 160 of FIG. 1, in some embodiments).

The software distribution server 480 may include one or more data storage devices 482 (hereinafter "storage device" 482). The storage device 482 may include computer-readable instructions 484 configured to instruct the personal computing device 490 of the user to perform the functions that the use data router 154 (FIG. 1) is configured to perform. For example, the computer-readable instructions 484 may be configured to instruct the personal computing device 490 to receive use data 158 from the audio device 200 (FIG. 1), process the use data 158, transmit the use data 158 through one or more networks 160 to the remote servers 170 (FIG. 1), provide date/time update data 216 to the audio device 200 (FIG. 2), provide user interfaces to enable the user to electronically agree to provide the use data 158, or combinations thereof. The software distribution server 480 may be configured to transmit the computer-readable instructions 484 to the personal computing device 490 through one or more networks 460 (e.g., may be the same as the networks 160 of FIG. 1, in some embodiments).

The personal computing device 490 may be configured to receive the computer-readable instructions 484 from the software distribution server 480, and execute the computer-readable instructions 484. By way of non-limiting example, the personal computing device 490 may include a personal computer (e.g., desktop computer, laptop computer), a mobile device (e.g., a tablet computer, a smartphone, a personal digital assistant, etc.). The personal computing device 490 may include an operating system (e.g., MICROSOFT®, APPLE®, ANDROID®, AMAZON®, LINUX®, UNIX® operating systems, etc.). As a result, the computer-readable instructions 484 may be configured to operate within the operating system of the personal computing device 490.

The personal computing device 490 may include at least one processing element 494 (hereinafter "processing element" 494) (e.g., a central processing unit (CPU), a microcontroller, etc.), at least one data storage device 498 (hereinafter "storage device" 498) (e.g., non-volatile data storage), at least one memory device 496 (hereinafter "memory device" 496) (e.g., random access memory), and one or more communication elements 492 (hereinafter "communication elements" 492) (e.g., wireless and wired network interfaces). The processing element 494 may be operably coupled to the communication elements 492, the memory device 496, and the storage device 498. The communication elements 492 may be configured to receive the computer-readable instructions 484 from the software distribution server 480. The processing element 494 may be configured to store the computer-readable instructions 484 in the storage device 498. The processing element 494 may also be configured to transfer the computer-readable instruction 484 to the memory device 496 for executing, and execute the computer-readable instructions 484 on the memory device 496. In this way, the computer-readable instructions 484 may transform the personal computing device 490 into the use data router 154.

In some embodiments, the computer-readable instructions 484 may also include instructions configured to instruct the personal computing device 490 to perform the functions of the media player 152 (FIG. 1). Accordingly, the computer-readable instructions 484 may also be configured to transform the personal computing device 490 into the media player 152.

Figure 5:
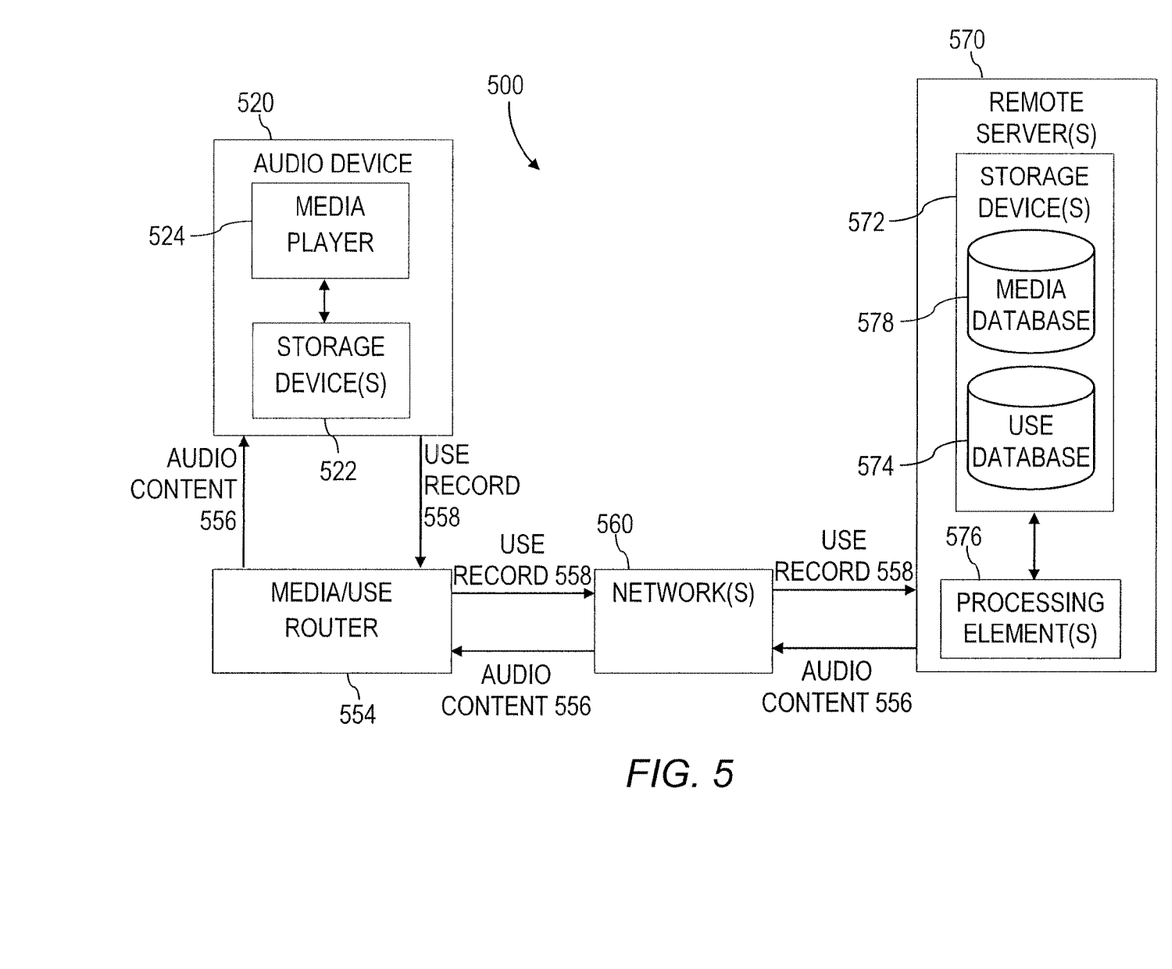
FIG. 5 is a simplified block diagram of another audio system.

FIG. 5 is a simplified block diagram of another audio system 500. The audio system 500 may include an audio device 520 configured to receive (e.g., through communication interfaces similar to the communication interfaces 214 of FIG. 2) and store, to one or more data storage devices 522 (hereinafter "storage device" 522) of the audio device 520, audio content 556 including data corresponding to a stream of audio media (e.g., compressed audio media, uncompressed audio media, and combinations thereof, in the form of individual songs, playlists, smart playlists, and combinations thereof, potentially having different characteristics, such as, for example, high BPM/high intensity music, medium intensity, low intensity, and so-called "power songs" that the user, a trainer, or a biometric system has determined results in desirable output and performance) from a media/use router 554. The audio device 520 may include a media player 524 configured to convert the audio content 556 to audio signals, which may be provided to speaker elements (e.g., similar to the speaker elements 240 of FIG. 2) of the audio device 520. Accordingly, the audio device 520 may be configured to download the audio content 556 from the media/use router 554, and play the audio content 556 whether or not the audio device 520 remains connected to the media/use router 554, or any other device (e.g., the audio device 520 may play media without being connected to other devices, such as, for example, when the use is on the go, operating the audio device 520 offline, etc.).

The media player 524 may be configured to store a use record 558 of the audio content 556 played by the media player 524 on the storage device 522. By way of non-limiting example, the use record 558 may include information indicating which tracks of the audio content 556 were played, how many times they were played, when and where the tracks were played, which tracks were skipped, whether the entire track or just a portion thereof was played, etc. The audio device 520 may be configured to provide the use record 558 stored on the storage device 522 to the media/use router 554 when the audio device 520 enters communication with the media/use router 554.

The audio device 520 may include a device capable of converting audio signals to acoustic waves that may be heard by a user of the audio device 520. By way of non-limiting example, the audio device 520 may include a smart headphone device, or a smart speaker device (e.g., a wireless speaker). By way of non-limiting example, the audio device 520 may include control circuitry similar to the control circuitry 220A of FIG. 3 (e.g., including one or more processing elements operably coupled to one or more memory devices, and configured to execute computer-readable instructions configured to instruct the processing elements to perform at least a portion of the functions the audio device 520 is configured to perform).

In some embodiments, the audio device 520 may also include at least a portion of the electrical interfaces 210, the tracking module 226, the date/time module 228, and the sensors 230 discussed above with reference to the audio device 200 of FIG. 2. Accordingly, the audio device 520 may also be configured to track use of the audio device 520 in connection with audio signals 156 received from external media players 152, as discussed with reference to FIGS. 1 and 2 above. Also, the use record 558 may include use data 158, as discussed above with reference to FIGS. 1 and 2.

In some embodiments, the audio device 520 may include a user interface (not shown) configured to enable the user to operate the media player 524 (e.g., browse identification information of specific media content of the audio content 556 stored in the storage device 522, select specific media and playlists to play, shuffle tracks, pause, skip tracks, repeat tracks, etc.). By way of non-limiting example, the audio device 520 may include an electronic display (e.g., a small LCD, touchscreen, LED array, etc.), menu navigation buttons (e.g., real buttons, soft buttons, etc.), a rollerball, a speech input system, audio menus, other input/output devices, and combinations thereof.

In some embodiments, the media player 524 may be configured to automatically select (instead of or in addition to manual selections of the user) which specific media content the media player 524 will play from the audio content 556 stored in the storage device 522. By way of non-limiting example, the audio device 520 may include biometric sensors (not shown) (e.g., a heart rate sensor, a pulse oxygenation sensor, a galvanic skin response sensor, a heart rate variability sensor, a temperature sensor, a motion sensor, and combinations thereof). The media player 524 may be configured to determine what media content to play to improve the user's performance in an activity the user is participating in while listening to the audio device 520 (e.g., an activity manually set by the user using a user interface, an automatically determined activity identified based, at least in part, on data from the biometric sensors, and combinations thereof). As a specific, non-limiting example, if the activity is running, the media player 524 may select music that may tend to encourage the user to run at a particular target speeds or cadences (e.g., play tracks with higher and lower beats per minute to encourage the user to respectively speed up and slow down running pace by matching music beats per minute to target rates of foot strikes against the ground). As another specific, non-limiting example, if the activity is exercise, the media player 524 may select music that tends to encourage the user to exercise at specific target heart rates (e.g., playing songs with higher beats per minute to encourage the user to exercise at a higher target heart rate, and playing songs with lower beats per minute to encourage the user to exercise at a lower target heart rate).

The media/use router 554 may include a personal computing device of the user of the audio device 520 (e.g., similar to the personal computing device 490 of FIG. 4), transformed by computer-readable instructions into the media/use router 554. Thus, a personal computing device 490 may be transformed into the media/use router 554 similarly to how the personal computing device 490 may be transformed into the use data router 154 (i.e., the software distribution server 480 of FIG. 4 may also be configured to transmit computer-readable instructions configured to instruct the personal computing device 490 to perform the functions of the media/use router 554 to the personal computing device 490). Furthermore, in some embodiments, the functions of the media/use router 554 may include, in some embodiments, at least a portion of the functions of the use data router 154 discussed above with reference to FIGS. 1, 2, and 4.

The media/use router 554 may be configured to provide the audio content 556 to the audio device 520. The media/use router 554 may also be configured to receive the use record 558 from the audio device 520. Although the media/use router 554 may be capable of monitoring what media content was provided to the audio device 520 in the audio content 556, the media/use router 554 may also be capable of determining what specific media content was actually played by the audio device 520 by analyzing the use record 558 provided by the audio device 520.

The media/use router 554 may also be configured to communicate with one or more remote servers 570 (hereinafter "remote server" 570) through one or more networks 560 (hereinafter "networks" 560) (e.g., similar to the networks 160 of FIG. 1). The media/use router 554 may be configured to transmit the use record 558 received from the audio device 520 to the remote server 570. Also, the media/use router 554 may be configured to receive audio content 556 from the remote server 570. By way of non-limiting example, the media/use router 554 may be configured to present a graphical user interface for a digital media store to the user of the audio device 520, enabling the user to purchase audio content 556 and/or receive free audio content 556 (e.g., in exchange for providing the use record 558, the use data 158 (FIG. 1), etc.) from the remote server 570 that may played by the audio device 520. It should be understood, however, that the media/use router 554 may also be configured to acquire other audio content 556 that may be played by the audio device 520 from other sources. By way of non-limiting example, the media/use router 554 may be configured to acquire audio content 556 stored on digital storage media that is either internal or external to the media/use router 554, rip audio optical discs (e.g., CDs), and other sources of audio content known in the art.

The remote server 570 may include one or more data storage devices 572 (hereinafter "storage device" 572) operably coupled to one or more processing elements 576 (hereinafter "processing element" 576). A media database 578 and a use database 574 may be stored on the storage device 572. The media database 578 may include data corresponding to audio content 556. The use database 574 may include use records 558 collected from media/use routers 554 of various users.

The processing element 576 may be configured to process use records 558 received from the media/use router 554, and stored in the use database 574. In some embodiments, the remote server 570 may be operated by a provider of the audio content 556. In licensing audio content 556 that the remote server 570 provides to the media/use router 554 (and to the audio device 520 through the media/use router 554), it may be beneficial for the provider to keep track of the specific media content that is actually played by the audio device 520. By way of non-limiting example, the provider may be charged a relatively large amount of money for specific audio media played by the audio device 520, and a relatively small amount of money (e.g., no money) for specific audio media provided to the audio device 520, but not played thereby. In some embodiments, the processing element 576 may be configured to determine what specific audio media was played by the audio device 520, and automatically settle any obligations (e.g., automatically pay owners of the audio content 556) the provider incurs through its provision of the audio content 556 to the media/use router 554 and the audio device 520.

In operation, the media/use router 554 may acquire audio content 556. By way of non-limiting example, the media/use router 554 may acquire audio content from the remote server 570 and other sources. The media/use router 554 may be operably coupled to the audio device 520, and store the audio content 556 to the storage device 522 of the audio device 520. The audio device 520 may be disconnected from the media/use router 554, and specific audio content 556 may be played by the media player 524 of the audio device 520. The media player 524 may store the use record 558 to the storage device 522. The next time the audio device 520 is operably coupled to the media/use router 554, the audio device 520 may transmit the use record 558 to the media/use router 554.

Additional non-limiting example embodiments of the present disclosure are set forth below.

Embodiment 1

An audio device, comprising: one or more electrical interfaces including: one or more audio inputs configured to receive audio signals from a media player; and one or more communication interfaces configured to communicate with a use data router; one or more speaker elements operably coupled to the one or more audio inputs and configured to convert the audio signals from the media player to acoustic waves; and control circuitry including: one or more data storage devices; a tracking module operably coupled to the one or more audio inputs and configured to extract use information from the audio signals and generate use data including the use information; and a storage interface operably coupled to the tracking module and the one or more data storage devices and configured to store the use data generated by the tracking module in the one or more data storage devices.

Embodiment 2

The audio device of Embodiment 1, further comprising a headphone device including the one or more electrical interfaces, the one or more speaker elements, and the control circuitry.

Embodiment 3

The audio device of Embodiment 1, further comprising a speaker device including the one or more electrical interfaces, the one or more speaker elements, and the control circuitry.

Embodiment 4

The audio device of any one of Embodiments 1 through 3, wherein the control circuitry is configured to transmit the use data to the use data router to route the use data to a remote server.

Embodiment 5

The audio device of any one of Embodiments 1 through 4, wherein the use data includes one or more segments of the audio signals.

Embodiment 6

The audio device of any one of Embodiments 1 through 5, wherein the control circuitry further includes a date/time module configured to provide date/time data including at least one of date information and time information to the tracking module, and wherein the tracking module is configured to include at least a portion of the date/time data in the use data.

Embodiment 7

The audio device of any one of Embodiments 1 through 6, further comprising one or more sensors configured to provide sensor data to the tracking module, wherein the tracking module is configured to provide at least a portion of the sensor data in the use data.

Embodiment 8

The audio device of Embodiment 7, wherein the one or more sensors include at least one sensor selected from the list consisting of an ambient light sensor, a temperature sensor, a global positioning system sensor, and a motion sensor.

Embodiment 9

The audio device of any one of Embodiments 1 through 8, wherein the one or more electrical interfaces include at least one wireless communication interface.

Embodiment 10

The audio device of Embodiment 9, wherein the wireless communication interface includes one of the one or more audio inputs.

Embodiment 11

A method of operating an audio device, the method comprising:
receiving, with an audio input of an audio device, an audio signal from a media player;
extracting use information from the audio signal by analyzing the audio signal with a tracking module of the audio device;
storing use data including the use information on a data storage device; and
transmitting the use data to a use data router configured to route the use data to a remote server.

Embodiment 12

The method of Embodiment 11, wherein transmitting the use data to the use data router comprises transmitting the use data responsive to the audio device establishing communication with the use data router.

Embodiment 13

The method of Embodiment 11 or Embodiment 12, wherein storing the use data includes storing the use information and at least one of date information and time information corresponding to a date and a time, respectively, that the use information was extracted from the audio signal.

Embodiment 14

The method of any one of Embodiments 11 through 13, further comprising erasing at least a portion of the use data from the data storage device of the audio device responsive to transmitting the use data to the data router.

Embodiment 15

A method of transforming a personal computing device into a use data router, the method comprising: storing, on a storage device of a software distribution server, computer-readable instructions configured to instruct a processing element of a personal computing device to: communicate with an audio device configured to receive audio signals from a media player and convert the audio signals into acoustic waves; receive, from the audio device, use data including information extracted from the audio signals by the audio device; and transmit the use data to a remote server; and transmitting the computer-readable instructions to the personal computing device.

Embodiment 16

The method of Embodiment 15, wherein the computer-readable instructions are further configured to instruct the processing element of the personal computing device to enable a user of the personal computing device to electronically enter into an agreement to allow the audio device to track use of the audio device.

Embodiment 17

The method of Embodiment 16, further comprising providing the audio device to the user responsive to the user entering the agreement to allow the audio device to track use of the audio device.

Embodiment 18

The method of any one of Embodiments 15 through 17, further comprising receiving, at a remote server, the use data from the personal computing device and storing the use data in a use database stored on a storage device of the remote server.

Embodiment 19

The method of Embodiment 18, wherein the use data includes segments of the audio signals, and the method further comprises identifying, with a processing element of the remote server, media corresponding to the segments of the audio signals.

Embodiment 20

The method of any one of Embodiments 15 through 19, wherein the computer-readable instructions are further configured to instruct the processing element of the personal computing device to provide a media player configured to provide the audio signals to the audio device.

Embodiment 21

A headphone device, comprising: one or more data storage devices configured to store audio content received from a media/use router comprising a personal computing device of a user of the headphone device; a media player configured to: play the audio content stored on the one or more data storage devices when the headphone device is disconnected from the media/use router; monitor specifics of use of the audio content by the headphone device; and store, on the one or more data storage devices, a use record including information identifying specifics of use of the audio content by the headphone device; and one or more communication interfaces configured to receive the audio content from the media/use router, and provide the use record to the media use router.

Embodiment 22

The headphone device of Embodiment 21, wherein the specifics of the use of the audio content comprise information identifying each audio track of the audio content that is played by the media player.

Embodiment 23

The headphone device of Embodiment 21 or Embodiment 22, wherein the specifics of the use of the audio content comprise information identifying audio tracks of the audio content that are only partially played.

Embodiment 24

The headphone device of any one of Embodiments 21 through 23, wherein audio content comprises at least one compressed stream of audio data.

Embodiment 25

The headphone device of any one of Embodiments 21 through 24, further comprising biometric sensors configured to provide biometric information to the media player.

Embodiment 26

The headphone device of Embodiment 25, wherein the media player is further configured to use the biometric information to automatically select audio tracks from the audio content stored on the one or more data storage devices to encourage the user to improve performance of an activity the user engages in while listening to the headphone device.

Embodiment 27

The headphone device of Embodiment 26, wherein the media player is further configured to automatically identify the activity using the biometric information.

Embodiment 28

A method of operating an audio system, the method comprising: providing audio content to a media/use router of a user of a headphone device to enable the user to store the audio content to the headphone device and play the audio content with the headphone device; receiving a use record generated by the headphone device, and routed by the media/use router from the headphone device, the use record identifying specific uses of the audio content by the headphone device; and storing the use data in a use database stored in one or more data storage devices of one or more servers remote from the headphone device.

Embodiment 29

The method of Embodiment 28, further comprising analyzing the use record stored in the use database to determine obligations owed to owners of the audio content responsive to the specific uses of the audio content by the headphone device, and automatically settling the obligations.

Embodiment 30

The method of Embodiment 29, wherein automatically settling the obligations comprises paying the owners of the audio content for the specific uses of the audio content by the headphone device.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A headphone for extracting and accumulating use data and transmitting the use data to a remote server, the headphone comprising:
   one or more electrical interfaces including:
      one or more audio inputs configured to receive audio signals from a media player; and
      one or more communication interfaces configured to communicate with a use data router;
   one or more speaker elements operably coupled to the one or more audio inputs and configured to convert the audio signals from the media player to acoustic waves;
   control circuitry including:
      one or more data storage devices;
      a date/time module;
      a tracking module configured to receive sensor data from at least two sensors for providing information about where a user was and what the user was doing when certain audio content was listened to, the tracking module operably coupled to:
         the one or more audio inputs, the tracking module configured to extract use information from the audio signals and generate the use data including the use information;
         the date/time module and configured to extract use information from the date/time module and generate the use data; and
      wherein the tracking module is configured to associate environmental information with the use information in the use data, and wherein the tracking module is configured to determine what media the user consumed while exercising, walking, sitting still, and/or laying down; and
   a storage interface operably coupled to the tracking module and the one or more data storage devices and configured to store the use data generated by the tracking module in the one or more data storage devices; and
   wherein the control circuitry is configured to transmit the use data to the use data router to route the use data to the remote server.

2. The headphone device of claim 1, wherein the use data includes one or more segments of the audio signals.

3. The headphone device of claim 1, wherein the date/time module is configured to provide date/time data including at least one of date information and time information to the tracking module, and wherein the tracking module is configured to include at least a portion of the date/time data in the use data.

4. The headphone device of claim 1, wherein the one or more electrical interfaces include at least one wireless communication interface.

5. The headphone device of claim 4, wherein the wireless communication interface includes one of the one or more audio inputs.

6. A method of operating a headphone to extract and accumulate use data and transmit the use data to a remote server, the method comprising:
receiving, with an audio input of the headphone, an audio signal from a media player;
extracting use information from the audio signal by analyzing the audio signal with a tracking module of the headphone;
generating sensor data utilizing at least two sensors operatively connected to the tracking module;
the at least two sensors selected from a list consisting of an ambient light sensor and a temperature sensor providing information about where a user was when certain audio content was listened to, and a motion sensor providing information about what the user was doing when the certain audio content was listened to;
extracting environmental information from the sensor data by analyzing sensor data with the tracking module of the headphone and associating the environmental information with the use information;
determining, using the tracking module, what media the user consumed while exercising, walking, sitting still, and/or laying down;
storing the use data including the use information and the environmental information on a data storage device of the headphone; and
transmitting the use data from the headphone to a use data router configured to route the use data to the remote server.

7. The method of claim 6, wherein transmitting the use data to the use data router comprises transmitting the use data responsive to an audio device establishing communication with the use data router.

8. The method of claim 6, wherein storing the use data includes storing the use information and at least one of date information and time information corresponding to a date and a time, respectively, that the use information was extracted from the audio signal.

9. The method of claim 6, further comprising erasing at least a portion of the use data from the data storage device of the audio device responsive to transmitting the use data to the use data router.

10. A headphone for extracting and accumulating use data and transmitting the use data to a remote server, comprising:
one or more data storage devices configured to store audio content received from a router comprising a personal computing device of a user of the headphone;
at least two sensors configured to generate sensor data, the at least two sensors selected from a list consisting of an ambient light sensor and a temperature sensor providing information about where the user was when certain audio content was listened to, and a motion sensor providing information about what the user was doing when certain audio content was listened to;
a media player configured to:
play the audio content stored on the one or more data storage devices when the headphone is disconnected from the router;
monitor specifics of use of the audio content by the headphone and generate the use data;
monitor the at least two sensors to detect environmental information and associate the environmental information with the use data, and determine what media the user consumed while exercising, walking, sitting still, and/or laying down; and
store, on the one or more data storage devices, a use record including information identifying specifics of use of the audio content by the headphone and the environmental information; and
one or more communication interfaces configured to receive the audio content from the router, and provide the use record to the router.

11. The headphone of claim 10, wherein the specifics of the use of the audio content comprise information identifying each audio track of the audio content that is played by the media player.

12. The headphone of claim 10, wherein the specifics of the use of the audio content comprise information identifying audio tracks of the audio content that are only partially played.

13. The headphone of claim 10, wherein audio content comprises at least one compressed stream of audio data.

14. The headphone of claim 10, wherein the at least two sensors comprise biometric sensors configured to provide biometric information to the media player.

15. The headphone of claim 14, wherein the media player is further configured to use the biometric information to automatically select audio tracks from the audio content stored on the one or more data storage devices to encourage the user to improve performance of an activity the user engages in while listening to the headphone device.

16. The headphone of claim 15, wherein the media player is further configured to automatically identify the activity using the biometric information.

* * * * *

UNITED STATES PATENT AND TRADEMARK OFFICE
CERTIFICATE OF CORRECTION

PATENT NO. : 10,338,880 B2
APPLICATION NO. : 15/159636
DATED : July 2, 2019
INVENTOR(S) : Thomas Burton

Page 1 of 1

It is certified that error appears in the above-identified patent and that said Letters Patent is hereby corrected as shown below:

In the Claims

| | | | |
|---|---|---|---|
| Claim 2, | Column 18, | Line 57, | change "The headphone device of" to --The headphone of-- |
| Claim 3, | Column 18, | Line 59, | change "The headphone device of" to --The headphone of-- |
| Claim 4, | Column 18, | Line 65, | change "The headphone device of" to --The headphone of-- |
| Claim 5, | Column 19, | Line 1, | change "The headphone device of" to --The headphone of-- |

Signed and Sealed this
Twenty-fourth Day of September, 2019

Andrei Iancu
*Director of the United States Patent and Trademark Office*